Oct. 18, 1966 R. G. HOLMAN 3,279,796
HOLLOW BALL WITH REINFORCING WINDINGS
Original Filed Aug. 12, 1958 10 Sheets-Sheet 1

INVENTOR.
RUDOLPH G. HOLMAN
BY
ATTORNEY

Oct. 18, 1966    R. G. HOLMAN    3,279,796
HOLLOW BALL WITH REINFORCING WINDINGS
Original Filed Aug. 12, 1958    10 Sheets-Sheet 3

INVENTOR.
RUDOLPH G. HOLMAN
BY
ATTORNEY

Fig. 9a.

Oct. 18, 1966 R. G. HOLMAN 3,279,796
HOLLOW BALL WITH REINFORCING WINDINGS
Original Filed Aug. 12, 1958 10 Sheets-Sheet 5

INVENTOR.
RUDOLPH G. HOLMAN
BY
ATTORNEY

Oct. 18, 1966  R. G. HOLMAN  3,279,796
HOLLOW BALL WITH REINFORCING WINDINGS
Original Filed Aug. 12, 1958  10 Sheets-Sheet 6

INVENTOR.
RUDOLPH G. HOLMAN
BY
ATTORNEY

Oct. 18, 1966 R. G. HOLMAN 3,279,796
HOLLOW BALL WITH REINFORCING WINDINGS
Original Filed Aug. 12, 1958 10 Sheets-Sheet 7

INVENTOR.
RUDOLPH G. HOLMAN
BY
ATTORNEY

INVENTOR.
RUDOLPH G. HOLMAN

BY

ATTORNEY

INVENTOR.
RUDOLPH G. HOLMAN
BY
ATTORNEY

Oct. 18, 1966  R. G. HOLMAN  3,279,796
HOLLOW BALL WITH REINFORCING WINDINGS
Original Filed Aug. 12, 1958  10 Sheets-Sheet 10

INVENTOR.
RUDOLPH G. HOLMAN
BY
ATTORNEY

United States Patent Office 3,279,796
Patented Oct. 18, 1966

3,279,796
HOLLOW BALL WITH REINFORCING
WINDINGS
Rudolph G. Holman, Santa Ana, Calif., assignor to W. J.
Voit Rubber Corp., Los Angeles, Calif., a corporation
of California
Continuation of application Ser. No. 754,551, Aug. 12,
1958. This application Jan. 23, 1963, Ser. No. 254,041
8 Claims. (Cl. 273—65)

This application is a continuation-in-part of the parent application 513,280, on "Ball Winding Method and Apparatus," filed on June 6, 1955, now abandoned and refiled as a continuation-in-part application 754,551, entitled "Ball Winding Method and Apparatus," filed on August 12, 1958, said continuation-in-part application now having been abandoned and refiled as the subject continuation application 254,041 on January 23, 1963. The parent application 513,280 was also refiled as a continuation-in-part application 635,514, on January 22, 1957, entitled "Ball Winding Apparatus," now United States Patent No. 3,071,331, issued January 1, 1963. The continuation-in-part application 635,514 was also divided and a divisional application entitled "Method of Winding a Ball" was filed October 2, 1961, Serial No. 142,272, which has now matured into United States Patent No. 3,136,492, issued June 9, 1964.

This invention relates to reinforcing windings for hollow spheres subjected to internal pressure of fluid under pressure within them. Although the invention is widely applicable for its basic purpose, it will be described as applied to the production of relatively large balls such as volley balls and basketballs. This particular practice of the invention as disclosed herein by way of example will provide adequate guidance for those skilled in the art who may have occasion to apply the same principles to other specific purposes, such as production of reinforced spherical hollow vessels.

In the winding of a ball core or an inflated bladder with filamentous material to fabricate a ball for sport and recreational use, the object is to achieve substantially uniform distribution of the windings over the spherical periphery of the ball with the windings to obtain a uniform distribution of the winding in order to obtain uniform strength of the wall and also extending in all directions. It is especially important to avoid contour irregularities arising from local concentrations of overlaps of the wound material so as to obtain a smooth spherical surface. It is also structurally important to have the individual turns approach as closely as possible great circles for obtaining maximum strength from the cord. The windings cannot precisely follow great circles, however, since the windings are necessarily serially interconnected and consequently continual change in winding direction is necessary for acceptable distribution of the individual turns.

The usual approach to the problem of winding a ball is to avoid close control of the individual turns and simply to seek random distribution. Such close control as would produce a recognizable predetermined winding pattern is avoided.

The heretofore prevalent procedure for winding a ball, for example, a soft baseball, is to rest the ball structure in a freely rotatable manner on two closely adjacent parallel cylindrical rolls and to rotate the two rolls in the same rotary direction while simultaneously reciprocating the two rolls longitudinally along their axes. The result is far from such control as would produce an ascertainable winding pattern in which identical winding cycles are continually repeated and in which a definite predetermined relationship between the successive cycles may be detected simply by inspecting a finished ball.

A serious disadvantage of this prior art, moreover, is that adequately random distribution of the windings requires relatively drastic reciprocation of the two rolls for continually drastic bias of the individual windings away from ideal great circle windings. Thus the individual windings of the finished ball are typically wide departures from great circles rather than approximations of great circles and great circle turns are approached only infrequently when the two rollers pause at the limits of their ranges of reciprocation.

The broad object of the present invention is to provide a reinforcing winding for a hollow sphere, the winding having a readily recognizable accurately predetermined winding pattern that results in efficient use of the winding material. The winding pattern may be readily detected in a finished winding since it comprises relatively short accurately predetermined winding cycles which are exactly identical with each other in their basic geometry and are successively shifted over the spherical area of the ball in an accurately predetermined manner. Efficiency in the use of a winding material is obtained, first, in the sense of achieving complete uniform coverage with minimum yardage and, second, in the sense of typically closely approaching great circles in the individual turns.

Each of the successive winding cycles comprises a group of turns resembling and actually approaching a series of intersecting great circles of longitude passing through the south and north poles on a globe representing the earth, the difference residing in the fact that these circles are interconnected and represent a continuous path followed by the reinforcing cord through the two poles. Thus, the successive individual turns of a winding cycle intersect in two diametrically opposite polar regions of the ball, just as the imaginary lines of longitude intersect at the two opposite polar regions of the earth. The transition from one winding cycle to another is accomplished during a pause period simply by continuing the final or the last turn of a cycle along a circle or a true great circle for a predetermined fraction of a turn and then repeating the winding cycle with the ensuing successive set of turns intersecting at a new pair of polar regions. The new pair of polar regions is displaced from the preceding pair by a predetermined distance in a predetermined relative direction. The length of the circular arc being determined by the duration of the pause period.

While the new winding pattern may be controlled and predetermined with high precision, it is, nevertheless, exceedingly flexible in that the pattern may be widely varied in various definitely known respects within the judgment exercised by those skilled in the present art. As will be explained, there are four distinct variables over which control may be exercised selectively.

It is, therefore, an object of this invention to provide a reinforcing winding for a hollow spherical shell, this winding including a set of turns of a cord, these turns approximating great circles and wound around two diametrically opposite polar regions located on the surface of the shell, the successive turns advancing continuously in one direction wound around the two polar regions; these sets are repeated over the entire surface of the spherical shell with the adjacent sets and their polar regions being displaced from adjacent polar regions by a length of said cord which follows a path of a circle or of a great circle over the surface of said shell.

An additional object of this invention is to provide a winding of the above type in which the length of the path of said cord between the two adjacent polar regions in the successive sets of turns is less than 360° and the above path comprises a continuation of the last turn in the preceding set and the number of turns in the sets varies from set to set.

An additional object of this invention is to provide a winding of the above type in which the length of the cord between two adjacent polar regions between two adjacent sets is not constant but varies from set to set.

The various objects and features of the invention will be apparent from the following detailed description considered with the accompanying drawings.

In the drawings, which are to be regarded as merely illustrative:

FIGS. 9a and 9b taken together are a plan view of a second form of apparatus having multiple winding stations;

FIG. 10 is a face view of a master dwell cam of the apparatus as seen along the line 10—10 of FIG. 9a;

FIG. 11 is a face view of a dwell-selector cam of the apparatus as seen along the line 11—11 of FIG. 9a;

FIG. 12 is a face view of a dwell-timing cam as seen along the line 12—12 of FIG. 9a;

FIG. 13 is a face view of a counting cam of the apparatus as seen along the line 13—13 of FIG. 9a;

Figures 1, 2, 3, 4, 5:
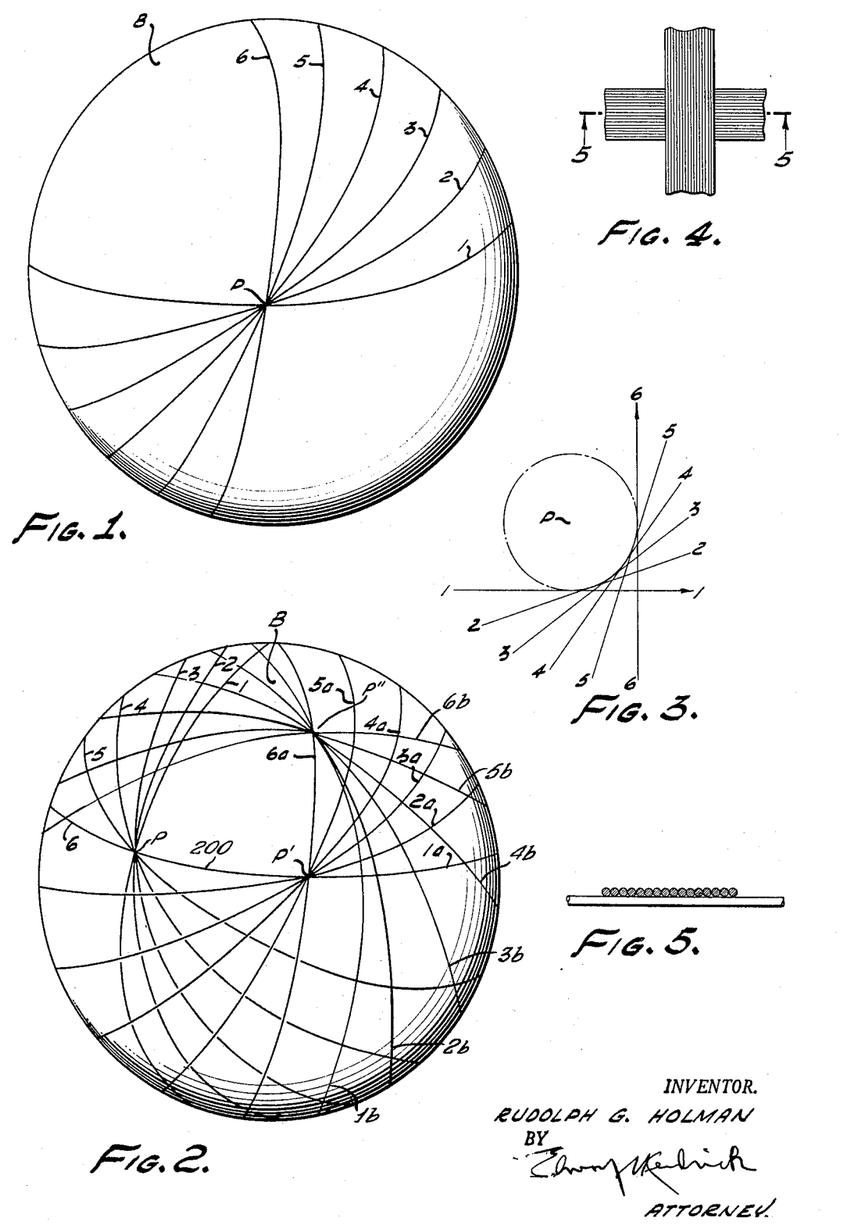
FIG. 1 is a simplified or diagrammatic view of a sphere showing a group of winding turns constituting a selected winding cycle of the invention, this winding cycle being repeated with successive displacements over the whole spherical area to produce a completely wound ball.
FIG. 2 is a similar view showing a second succeeding winding cycle added to the first winding cycle to show the geometrical relationship between successive winding cycles.
FIG. 3 is a similar fragmentary view showing how the intersections of the individual turns of a winding cycle may be dispersed over a polar region.
FIG. 4 is a fragmentary plan view on an enlarged scale of an intersection formed by an untwisted strand comprising a number of separate filaments.
FIG. 5 is a sectional view of the intersection along the line 5—5 of FIG. 4.

FIG. 1, which represents a ball in the process of being wound, shows a winding cycle comprising six turns of the winding material around a ball B, the successive turns of the cycle being numbered 1 to 6. In this instance, all of the windings of the cycle intersect at two polar points P, there being two such polar points at diametrically opposite positions on the periphery of the ball. The successive turns of the winding cycle are displaced approximately 15° as measured by the angles at the polar points P. Thus the total displacement for the cycle is 90° and the completed cycle covers approximately two diametrically opposite quadrants of the spherical area of the ball.

FIG. 2 shows the next succeeding winding cycle comprising six identical turns, numbered 1a to 6a, intersecting at a pair of diametrically opposite pole points P'. It is to be noted that the last turn 6 of the first set of turns and the initial turn 1a of the second set of turns pass through the two poles P and P' which are spaced apart on this continuation turn. The circular distance P–P' is, of course, a fraction of a circle. In the same way, a third successive winding cycle which is shown in FIG. 2 would start with the continuation of the turn 6–a and one of the poles P'' of the third winding cycle would be on the turn 6–a with the successive turns 1b–6b passing through pole P''. It is apparent that the paths described by the successive pairs of poles will conform to some particular geometrical pattern, the selected pattern of pole migration being such as to achieve the desired uniform distribution of the wound material over the spherical area of the ball.

The previously mentioned four variables that may be controlled selectively for covering of a ball may now be explained. What may be termed the first variable is the spacing or angular displacement of the successive turns of a winding cycle as measured by the angles of intersection of the successive turns at the two polar regions of the winding cycle. The second variable afforded by the invention is the concentration of the intersections at the two polar regions formed by a winding cycle. Maximum concentration is obtained at the two poles when intersection of the successive turns of a cycle is at two precise polar points rather than regions, as shown in FIGS. 1 and 2. Lesser concentration of the intersections is accomplished by dispersal of the succesive intersection points over a polar region. As will be pointed out more in detail later, when the ratio of two angular rotations of the sphere is other than 1:1 ratio, then the dispersed intersection points fall along a line that curves concentrically around an imaginary polar point. Thus in FIG. 3 the intersections of the turns of a winding cycle lie on a circle indicated by a dotted line instead of being concentrated at a single polar point.

The third variable is the number of turns and consequently the number of polar intersections in a winding cycle. Finally the fourth variable is the displacement of each pair of poles from the next preceding pair which is produced by the machine during the so-called pause period.

The meaning of "pause," in this case, is that the ball is rotated during the pause period around a stationary-in-space axis, and this axis is not oscillated in the course of the rotation of the ball. During the wind period, this axis is oscillated. Therefore, the term "pause" refers to the pause in the oscillation of the axis.

In the presently preferred practice of the invention, the angular displacement of the successive turns of a winding cycle is approximately 15°, as shown in FIGS. 1 and 2, and the successive turns of a winding cycle intersect at two polar regions. The preferred winding pattern is further characterized by six turns in each winding cycle and each of the diametrical pairs of poles is displaced from the preceding pair by about one-third of a great circle or approximately 120 degrees in the circular direction of the last turn of the preceding cycle. Each cycle covers approximately two quadrants or approximately half the surface of the ball by means of six turns produced during the wind period.

It can be readily appreciated from the foregoing discussion that other combinations of the four variables may be selected in various practices of the invention. In this regard a feature of the invention is that random manipulation of the four variables produces a superior winding pattern that affords full and uniform coverage of the ball with only moderate yardage of the winding material.

It is possible, of course, to pile up excessive intersections at local points by deliberately seeking to do so and using an inordinately large number of turns for each winding cycle. If the polar intersections are dispersed in the general manner shown in FIG. 3, however, there is great latitude in the number of turns that can be used for each winding cycle. It is possible, too, to cause the poles to overlap with undesirable effects. In actual practice, however, there is a high probability that random manipulation of the fourth factor will result in substantially uniform distribution of the successive polar regions over the spherical area of the ball, which can be obtained very readily by making the ratio of one ball revolution produced by wheel 34 to take place in a slightly shorter or a longer period of time than one oscillation of rollers 44, as will be pointed out more in detail later.

A feature of the preferred practice of the invention is the concept of employing a winding strand that comprises a bundle of separate and more or less parallel elements instead of a single twisted or cord-like strand. In this particular practice of the invention the strand comprises 34 nylon filaments and the 34 filaments are so small that they can be bunched together to form a compact strand having a circular cross-section and the diameter on the order of .002 to .003 inch, although larger diameters up to .012 of an inch may be used. One important advantage of employing such a multiple-filament strand with only a limited twist is that the strand flattens out to provide greater coverage by each winding turn than can be accomplished with a cord having many twists per inch of its length. Another advantage of special importance is that the strands flatten out to make relatively shallow intersections. FIGS. 4 and 5, for example, show such an intersection in a simplified manner on an enlarged scale. It is apparent that the multiple-filament strand behaves more like a thin ribbon than a twisted cord. In practice it is desirable to give some twist to the strand of 34 filaments, say a twist of seven turns per inch, but with this mild twist the strand tends to flatten in substantially the manner indicated in FIGS. 4 and 5. The test is whether or not the multiple-filament strand tends to wind more in the manner of a ribbon than in the manner of a solidly cylindrical cord.

Although the nylon strand comprises a comparatively large number of filaments, the strand is exceedingly fine in contrast to the cross-sectional dimension of winding material that is usually employed for this purpose. Relatively fine strands have been employed heretofore in some instances but, to my knowledge, not in the form of only loosely twisted multiple-filament strands.

The advantages of using a strand of nylon filaments for the winding, i.e., the layer between the inner bladder and the outer cover, has the following advantages over prior art practices:

(1) Adequate coverage and more adequate strength are obtained with less total weight of material. The official weight of a basketball is 21 ounces with a tolerance of plus or minus one ounce. The lightening of the wound layer without sacrifice strength makes it possible to increase either the weight of the inner bladder, or the weight of the outer cover, or both, as may be desired, without exceeding the regulation weight. When the usual twisted thread or cord is used, however, the need for coverage dominates the need for strength and an excessive amount of the winding material must be used to provide adequate coverage.

(2) While the nylon material is more costly per pound than the usual winding material, there is so much less weight required for adequate coverage and strength that there is actually a saving in material cost.

(3) The larger the number of well distributed turns in a winding layer, the nearer the finished layer approaches uniformity in character and thickness. The wound layer of a basketball produced as herein taught has several times as many turns as found in the usual wound ball. The flattening of the mildly twisted strand of filaments also contributes to the uniformity of the wound layer in providing more coverage per turn and in reducing the thickness of intersections.

(4) the wound layer of nylon provides a relatively thin carcass for the ball. A relatively thin wound carcass is less likely to fatigue and fail than a relatively thick wound carcass because less internal friction and stress in compression and tension are involved in the flexing of a thin layer than in the stressing of a thick layer. It is also to be pointed out that the more intricate and efficient the distribution of the winding material, with more strands per unit area, as provided by the present invention, the less the possibility of local weakness developing anywhere in the carcass. Since the new carcass is relatively light in weight, longer life may be further favored, within the total weight limitation, by either thickening the bladder or the cover, or both, as heretofore stated.

(5) The use of a relatively thin wound layer composed of a relatively fine nylon strand, as described herein, makes it possible to obtain substantially uniform tensioning of the windings in the finished ball in a manner not possible with thicker wound layers of the character heretofore employed. If an inflated bladder is wound with a strand under tension, the outer wound layers tend to remove the tension of the inner layers. On the other hand, if the strand is wound under substantially no tension, the expansion involved in the final cure of the ball places the inner windings under high tension and leaves the outer windings relatively slack. This effect may be understood when it is considered that the inner windings are subjected to a higher percentage of circumferential expansion than are the outer layers. The present invention solves this dilemma, in part, by using a relatively thin wound layer to narrow the circumferential differential between the inner windings and the outer windings; in part, by winding the strands under appreciable tension to cause a certain degree of relaxation of the inner windings which is automatically removed in the subsequent high pressure expansion for the final cure; and, in part, by employing a nylon strand having no significant degree of twist. An untwisted strand stretches less than a twisted strand and it has been found that nylon behaves in the winding and curing stages in a manner that is conducive to the desired final uniform tensioning of the strand in the wound carcass.

(6) Since there is a substantial saving in weight in the wound layer, it is possible to impregnate the wound layer with various materials for various purposes and still keep the total weight of the wound layer relatively low. The impregnating material may be primarily an adhesive, or may be a sealing material for air retention, or may be applied primarily to fill up the voids in the wound layer. In the preferred practice of the invention a suitable adhesive is sprayed onto the ball as the newly laid nylon strand is laid in the winding operation. The sprayed material anchors the wound strand in place and in addition impregnates the strand.

Figure 6:
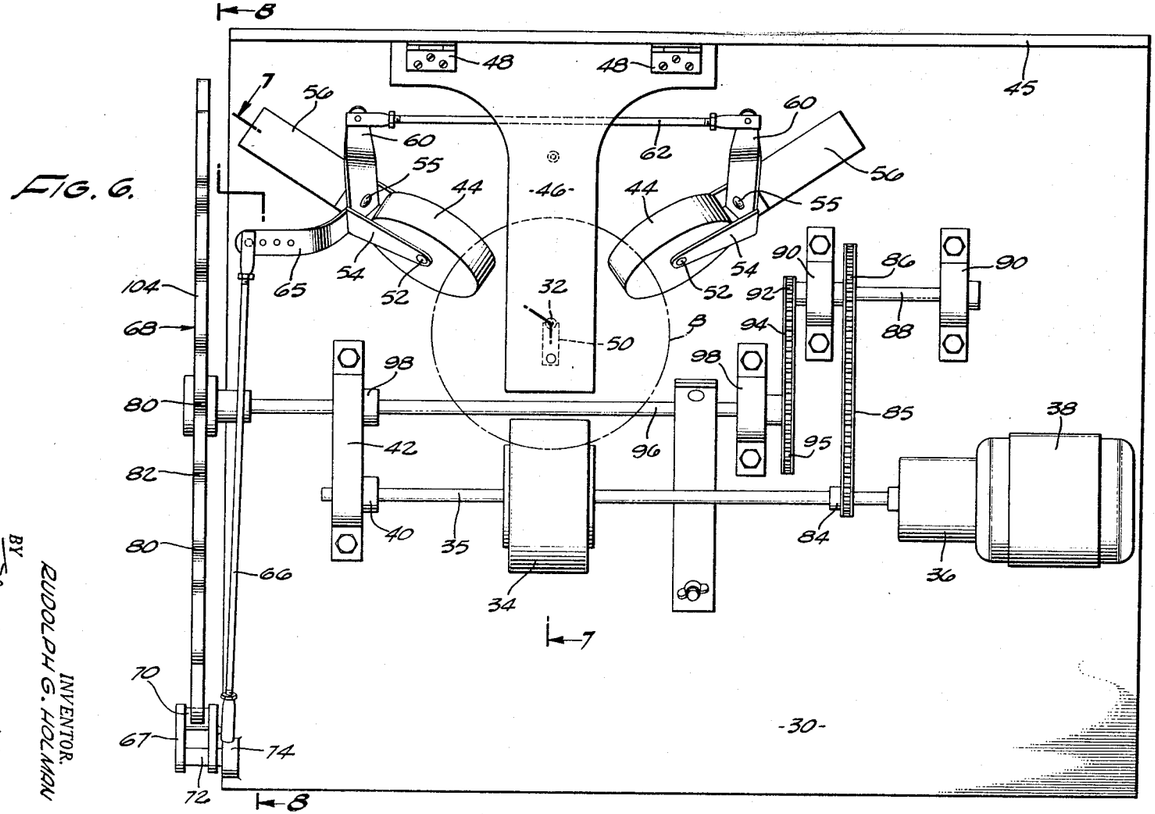
FIG. 6 is a plan view of one form of apparatus that may be used to carry out the invention.
Figure 7:
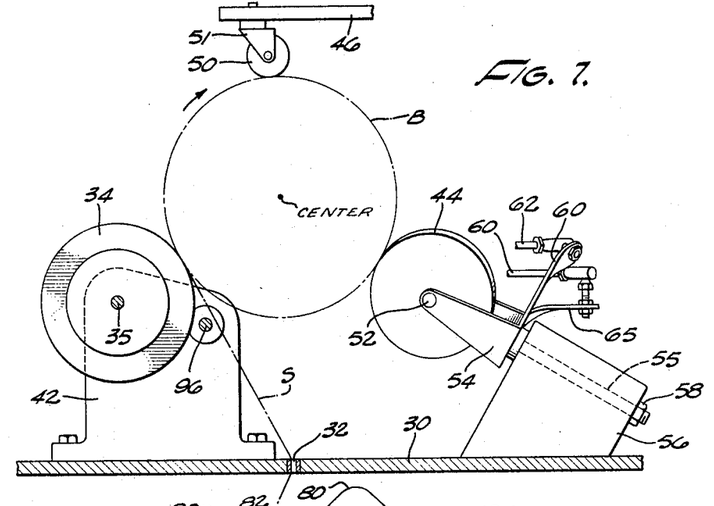
FIG. 7 is a sectional view taken as indicated by the angular line 7—7 of FIG. 6.
Figure 8:
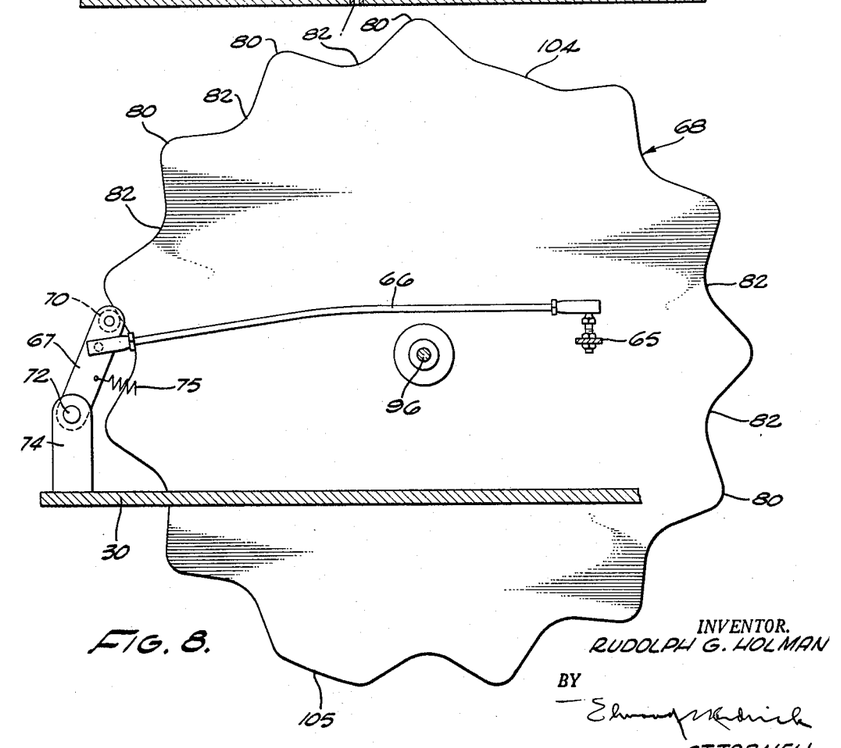
FIG. 8 is a section taken as indicated by the line 8—8 of FIG. 6, showing the configuration of a control cam of the apparatus.

The first and simpler form of apparatus for carrying out the described method of winding a ball is shown in FIGS. 6, 7 and 8. The apparatus includes an elevated base plate 30 with a small sleeved aperture 32 therein, through which a strand S may extend upward from a source below the base plate to wind onto a ball B.

A suitable drive roller 34 for rotating the ball B is positioned for peripheral tangential contact with the ball and for this purpose is mounted on a drive shaft 35. The drive shaft 35 extends from a gear box 36 on a motor 38 and is supported at its outer end by a bearing 40 in an upright bearing support 42.

Two idler rollers 44 located on opposite sides of the plane of rotation of the drive roller 34 are positioned for peripheral tangential contact with the ball B at two spaced points on opposite sides of the plane of rotation of the drive roller 34. The two idler rollers 44 cooperate with the drive roller 34 to form a three-point seat for supporting the ball B. The two idler rollers 44 are positioned at least 120 degrees from the drive roller 34 and are not more than 120 degrees apart. Preferably the two idler rollers are less than 120 degrees apart since lessening this spacing increases the pressure of the drive roller 34 on the ball when the ball is pressed into the three-point seat.

Any suitable arrangement may be used to releasably hold the ball B in the three-point seat provided by the drive roller 34 and the two idler rollers 44. In the present apparatus an upright plate 45 at the rear edge of the base plate 30 is provided and an upper forwardly extending arm 46 is mounted on the upright plate 45 by hinges 48 to weigh down the ball B. As best shown in FIG. 7 the arm 46 for pressing the ball down to the three-point seat is provided with a small roller or caster 50 in a swiveled bracket 51. The arm 46 may be swung upward out of the way whenever it is desired to replace a ball in the three-point seat.

Each of the two idler rollers 44 is mounted by an axle 52 in a bracket 54 having a pivot shank 55. The pivot shank 55 is rotatably mounted in a suitable bearing 56 and is retained therein by a nut 58. Each of the two brackets 54 for the two idler rollers has an operating arm 60 to cause oscillation of the idler rollers about the axis of its pivot shank and these two operating arms are interconnected by a link 62. By virtue of this link the two idler rollers 44 may be oscillated in a synchronous manner. One of the idler roller brackets 54 is provided with a second operating arm 65 which is connected by an operating rod 66 to a rocker arm 67 controlled by a relatively large cam wheel 68. The rocker arm 67, which comprises two parallel interconnected bars carries a roller 70 at its upper end which functions as a follower in contact with the periphery of the cam wheel 68. The rocker arm 67 is mounted by a pivot 72 on an upright support 74 and is continuously pulled towards the periphery of the cam wheel by a suitable coiled spring 75.

It will be noted in FIG. 7 that the axis of oscillation of an idler roller 44, i.e., the axis of the shank 55 of the idler roller bracket is on a diameter of the idler roller and passes through the point at which the periphery of the idler roller makes tangential contact with the ball B. Preferably, this axis intersects the center C of the ball B and is inclined downward from the ball center C. The angle of downward inclination relative to the horizontal may be on the order of 45 degrees, the angle being somewhat less than 45 degrees in this particular embodiment of the invention. Note also in FIG. 7 that the axis of the drive roller 34 is positioned 45° downward from the center of the ball B. None of these angles is critical, however.

The cam wheel 68 has a periphery with an undulating configuration forming alternate peaks 80 and valleys 82. As the follower 70 on the rocker arm 67 traverses the periphery of the cam wheel 68 from one peak to the next succeeding peak or from one valley to the next succeeding valley the two idler rollers 44 make one complete oscillation about the corresponding pivot shanks 55, each idler roller swinging from one limit position to the opposite limit position and back to the first limit position. As heretofore stated, the time interval of one such complete oscillation of the two idler rollers 44 approximates the time interval of one complete rotation of the ball B by the drive roller 34. It is preferable to have a slight difference between the two time periods, such as 1:1.03, to avoid point intersection of turns at the two poles which create high spots.

Any suitable arrangement may be used to actuate the cam wheel 68 in the desired time relation to the ball B. In the present embodiment of the apparatus, the cam wheel 68 is operatively connected to the drive shaft 35 that carries the drive roller 34. For this purpose a sprocket 84 on the drive shaft 35 is connected by a sprocket chain 85 with a sprocket 86 on a counter shaft 88. The counter shaft 88, which is mounted on a pair of bearings 90, carries a sprocket 92. The sprocket 92 is connected by a sprocket chain 94 with a sprocket 95 on a shaft 96. The shaft 96 is journaled in a pair of bearings 98 and carries the cam wheel 68.

The particular cam wheel 68 shown in FIG. 8 is designed to create successive substantially identical winding cycles of approximately 6½ turns each. For this purpose the cam wheel has two sets or series of 6 peaks 80, and these two series of 6 peaks each are separated by a lower dwell or expanded valley 104 and by an upper dwell or expanded peak 105, these two dwells being substantially 180 degrees apart. In this instance each of the two dwells has a circumferential length that is approximately ⅓ of the circumferential distance from one peak 80 to the next succeeding peak 80. Since the peak-to-peak distance represents substantially one revolution of the ball, each of the two dwells corresponds to approximately ⅓ of a revolution of the ball, i.e., approximately 120°.

The manner in which the described apparatus carries out the process of winding a ball may be readily understood. The oscillation of the two idler rollers 44 about their points of contact with the ball B is substantially frictionless with no dragging effect on the ball. The inclination of the drive rollers in opposite directions in the course of a single rotation of the ball causes the currently applied winding on the ball to be biased first in one direction for approximately 180 degrees of rotation of the ball and then to be biased in the opposite direction for the remainder of the rotation. As a result, the successive turns around the ball intersect in two diametrically opposite polar regions with an angular displacement of approximately 15 degrees between the successive turns. In this manner the strand S is wound on the ball B in winding cycles of 6½ turns each. At the end of each of these winding cycles there is a pause in the oscillation which causes the winding to continue just off great circles for approximately ⅓ of the circumference of the ball to start a new winding cycle.

The heretofore mentioned first variable in the winding cycle comprising the angular displacement of the successive turns of a winding cycle as measured at the two poles is determined by the amplitude of the oscillations of the two idler rollers 44, i.e., by the radial differential between the peaks 80 and the valleys 82 of the cam wheel 68. This radial differential may be varied at will.

The second variable or the concentration of the intersections of the windings at the two polar regions of a winding cycle depends upon the time ratio between the oscillations of the idler rollers 44 and the rotations of the ball B by wheel 34. With the rollers oscillating in exact phase with the rotation of the ball B, the intersections, theoretically, are concentrated at two precise polar points. If desired, the drive sprocket 84 may be either enlarged or reduced to make the peak-to-peak rotation of the cam wheel slightly out of phase with the rotation of the ball to result in dispersal of the intersections in the two polar regions of each winding cycle to avoid the creation of high points at the poles.

The third variable, which is the number of turns in a winding cycle, may be increased or reduced by increasing or reducing the number of peaks and valleys on the cam wheel in each of the two series of peaks and valleys. In this regard it is to be noted that the two series of peaks and valleys on the cam wheel 68 need not be equal. Thus, instead of two operating cycles of approximately 6½ turns each, the cam wheel 68 could be shaped to cause one operating cycle of 8½ turns followed by an operating cycle of 4½ turns. In such an arrangement the alternate winding cycles would be identical. It also follows that it is possible to have more than two winding cycles, or periods, and more than two pause periods on a single cam.

Thus, the machine is capable of winding a plurality of sets of polarized turns, each set of polarized turns, such as six turns illustrated in FIG. 1, having the same or different number of turns in the successive sets. The pause periods also may or may not be equal to each other. The complete reiterative cycle, therefore, includes a plurality of sets of turns, or a group of sets which also includes an equal plurality of circular sectors, which may be a part of a great circle or a part of a small circle, the two pluralities constituting the above-mentioned reiterative cycle or a group of sets. This identical group then is repeated many times to complete the entire winding.

The fourth variable, which is the displacement of each diametrical pair of poles from the previous pair depends upon the circumferential extent of the two dwells 104 and 105. Obviously, it is a simple matter to vary the circumferential dimensions of these dwells, and, of course, the two dwells need not both be of the same circumferential dimension.

The second form of the aparatus, shown in FIGS. 9a to 17, provides a plurality of winding stations positioned back to back in two parallel rows, the two rows of stations being mounted on two elevated co-planar platforms or base plates 110. Each of the winding stations has a drive roller 112 and two beveled idler rollers 114 which cooperate to provide a three-point seat for supporting a ball B.

At each of the winding stations a strand S is supplied by a spool 115 and controlled by a well known type of automatic tensioning device 116. The strand S is led upward through a sleeved aperture 118 to the periphery of the ball as shown in FIG. 14.

At each winding station an atomizer or spray head 120 is adjustably mounted by a jaw-type holder 122 on an upright support rod 124. The various spray heads are supplied by a compressed air supply pipe 125 and a liquid supply pipe 126 which are housed in a longitudinal channel 128 along each row of stations. Air from the supply pipe 125 is supplied to each of the spray heads 120 through a flexible hose 130 controlled by a valve 132 and a liquid cement from the supply pipe 126 is fed to the spray head through a hose 134 having a valve 135. A third hose 136 is connected to each spray head for remote control of the operation of the gun by air pressure. In the presently preferred practice of the invention the liquid cement supplied by the pipe 126 is a coumarone-indene resin but other adhesive or sealing liquids can be used in various practices of the invention.

Figures 14, 17:
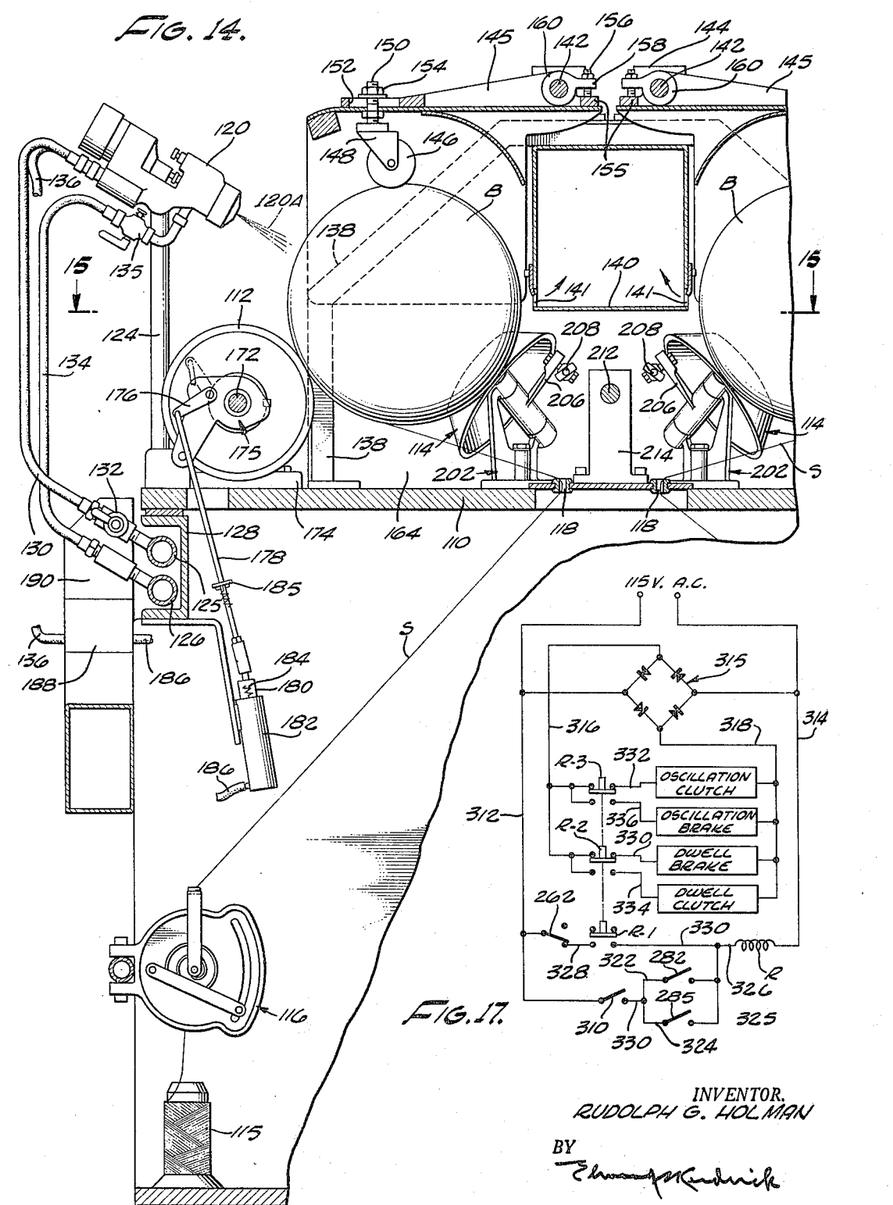
FIG. 14 is a vertical sectional view of a portion of the apparatus along the line 14—14 of FIG. 9b, showing the winding mechanism at one of the winding stations.
FIG. 17 is a wiring diagram of the control system used in the apparatus shown in FIGS. 9a and 9b.

FIG. 14 illustrates a stream 120A of the adhesive material leaving gun 120 and impinging on the surface of the ball B and the nylon winding being wound on the ball.

The two rows of winding stations are provided with a frame structure 138 which carries a central exhaust duct 140 for removing vapors released by the various spray heads. This duct has intake ports 141 at the various winding stations. Mounted on top of the frame structure 138 is a pair of shafts 142 journaled in spaced bearings 144. Rotatably mounted on these shafts 142 are a plurality of overhanging arms 145, there being one arm at each winding station to weight down a ball B. Each of these overhead arms 145 carries a small pressure roller or caster 146 in a swivel bracket 148. The swivel bracket 148 has a shank 150 that extends through a longitudinal slot 152 in the overhead arm and is adjustably retained therein by a pair of nuts 154.

Each of the overhanging arms 145 is independently rotatable on the corresponding shaft 142 and may be individually swung up and back manually to permit replacement of a ball at the winding station. If desired, however, all of the overhanging arms 145 on either of the two shafts 142 may be raised simultaneously by rotation of the shaft. For this purpose each of the overhanging arms 145 has a rearwardly extending flange 155 which normally rests against an adjustable screw 156 carried by a finger 158. The finger 158 is unitary with a sleeve 160 that is fixedly mounted on the corresponding shaft 142 by a set screw 162. It is apparent that rotation of a shaft 142 in a direction to depress the fingers 158 thereon will cause all of the overhanging arms 145 on the shaft to be rotated upward.

Each of the winding stations is largely enclosed by a suitable hood structure to cause the vapors released by the spraying operation to be confined and drawn off by the exhaust duct 140. The hood structure for each winding station includes two side walls 164 (FIG. 15) and an upper wall structure 166 carried by the corresponding overhanging arm 145.

Figure 9A:
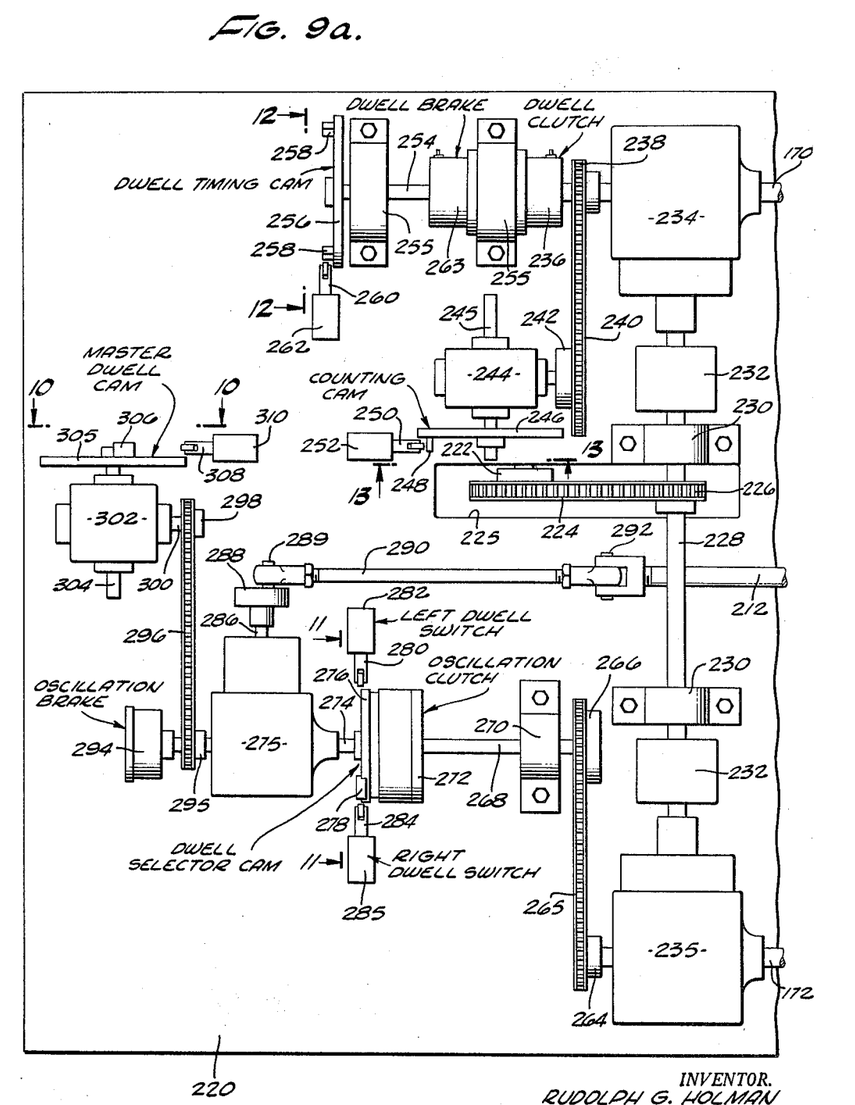
Figures 9B, 10, 11, 12, 13:
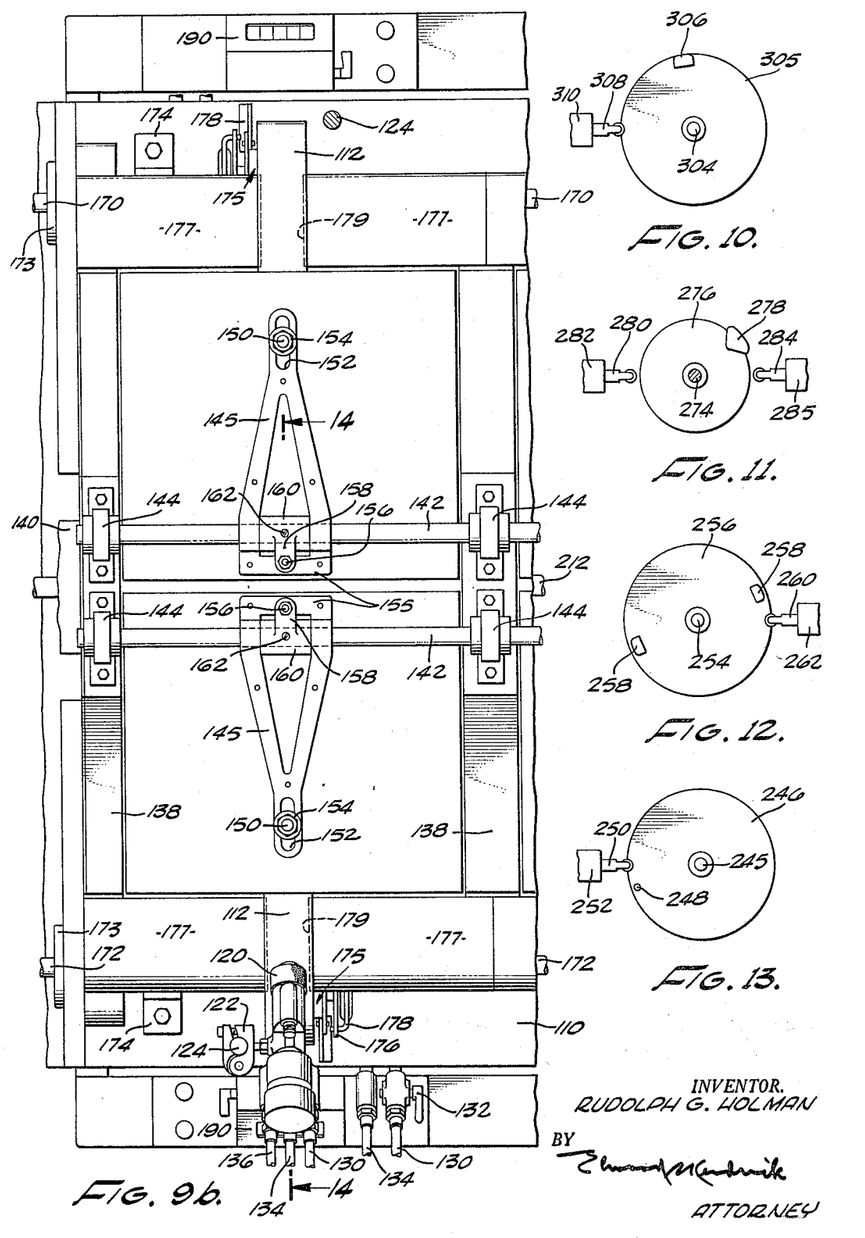

All of the drive rollers 112 of one of the two rows of winding stations are rotatably mounted on a common drive shaft 170 and all of the drive rollers of the other row of winding stations are mounted on a second similar drive shaft 172 (FIG. 9b). These two shafts which may be made in several sections connected by couplings 173 are journaled in spaced bearings 174. Preferably each of the drive shafts 170 and 172 is provided with a curved guard 177, which guard has gaps 179 to clear each of the drive rollers 112.

Each of the drive rollers 112 is operatively engageable with the corresponding drive shaft by means of an individual clutch 175 that is controlled by a rocker arm 176. The rocker arm 176 of each clutch 175 is connected by a link 178 with a piston 180 of an air cylinder 182 for remote control of the clutch by compressed air. A suitable coiled spring 184 connected at one end to a clip 185 on the link 178 and connected at the other end to the air cylinder 182 normally holds the clutch in engagement to drive the roller 112. When compressed air is admitted to the air cylinder through a control hose 186, the clutch is disengaged in opposition to the tension of the coiled spring.

The delivery of compressed air to the control hose 186 is governed by a valve 188 that is adapted for electrical actuation by a corresponding counter 190, there being a counter at each of the winding stations. The counter 190 is energized by electrical pulses generated at a central control station, as will be explained, and may be set to predetermine the yardage of the strand S that is wound on each of the balls B. The counter progresses to its zero position from whatever yardage value at which it may be set and then actuates the valve 188. Actuation of the valve 188 not only delivers compressed air to the control hose 186 to disengage the clutch 175 for stopping the winding operation at the winding station but also delivers compressed air to the previously mentioned control hose 136 to stop operation of the corresponding spray head 120.

Figure 16:
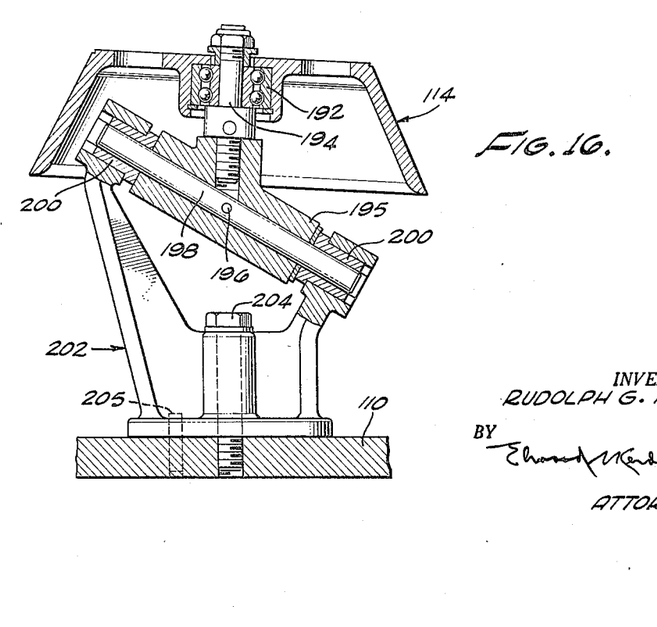
FIG. 16 is a fragmentary section taken as indicated by the line 16—16 of FIG. 15.

As best shown in FIG. 16 each of the beveled idler rollers 114 is mounted by a ball bearing 192 on a spindle 194 that is carried by an inclined sleeve 195. Inclined sleeve 195 is fixedly held by a screw 196 on an inclined pivot pin 198 and the opposite ends of the pivot pin are journaled in a suitable bearing bushing 200 in a bracket 202. Each of the brackets 202 is mounted by a central screw 204 on the corresponding platform 110 and is secured against rotation on the platform by a suitable key or dowel 205.

Figure 15:
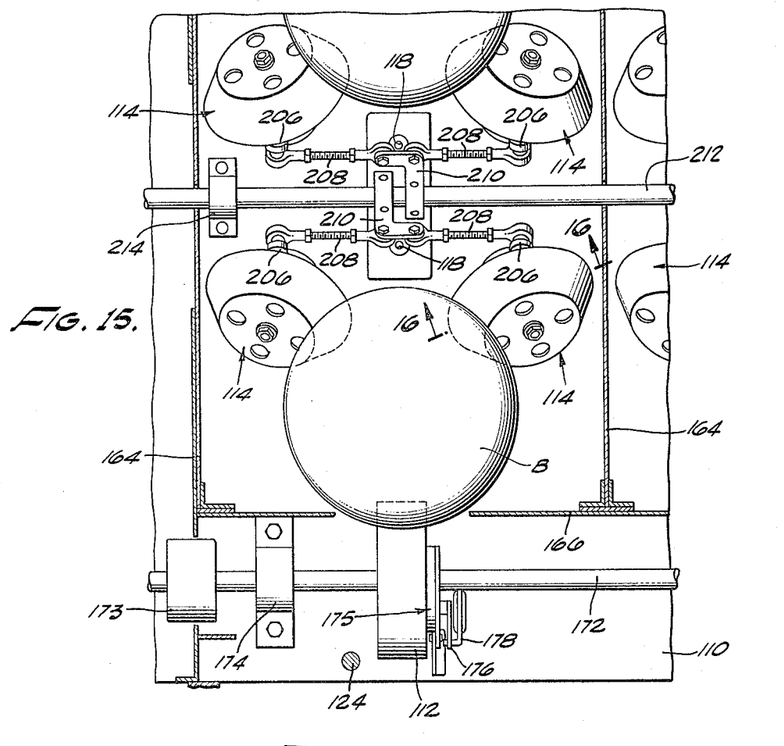
FIG. 15 is a horizontal sectional view along the line 15—15 of FIG. 14.

The sleeve 195 that carries the spindle 194 has a control arm 206 for oscillation of the idler roller 114 about the axis of inclined pivot pin 198. As best shown in FIG. 15, the two control arms 206 of the two idler rollers 114 at each winding station are connected by a pair of corresponding links 208 to an angular bracket 210. All of the angular brackets 210 of the two rows of winding stations are fixedly mounted on a longitudinally reciprocative shaft 212 that is slidingly mounted in suitable bearings 214. It is apparent that the shaft 212 may be reciprocated longitudinally to cause the simultaneous oscillation of all of the idler rollers 114 of the two rolls of winding stations.

As may be seen in FIG. 15, the two beveled idler rollers 114 at each winding station are relatively close together with their beveled surfaces tangential to the ball B. As may be seen in FIG. 14 the axis of the drive roller 112 at each winding station is positioned in a direction approximately 45 degrees downward from the center of the ball B. The axis of oscillation of each of the idler rollers 114, i.e., the axis of the inclined pivot pin 198 passes through the point of tangential contact of the beveled idler roller with the periphery of the ball B and intersects the center of the ball at an angle of 45 degrees downward from the horizontal.

Figure 18:
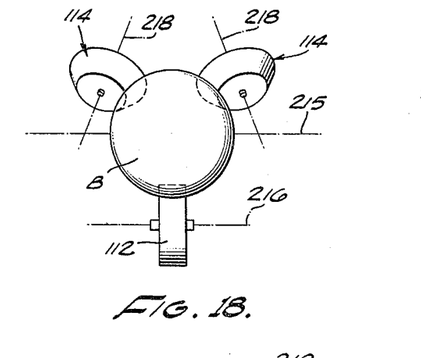
FIG. 18 is a simplified plan view of the winding mechanism at a winding station of the apparatus, the mechanism being shown at one stage of the winding operation.
Figure 19:
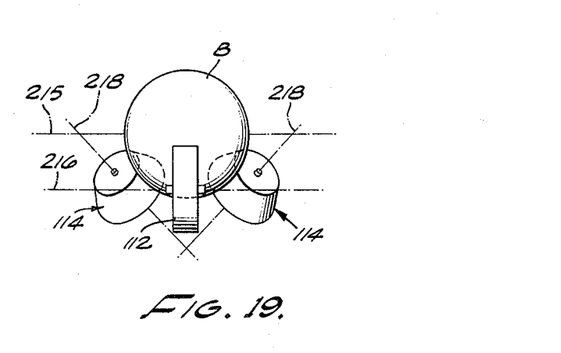
FIG. 19 is an end elevation of the structure shown in FIG. 18.
Figures 20, 21:
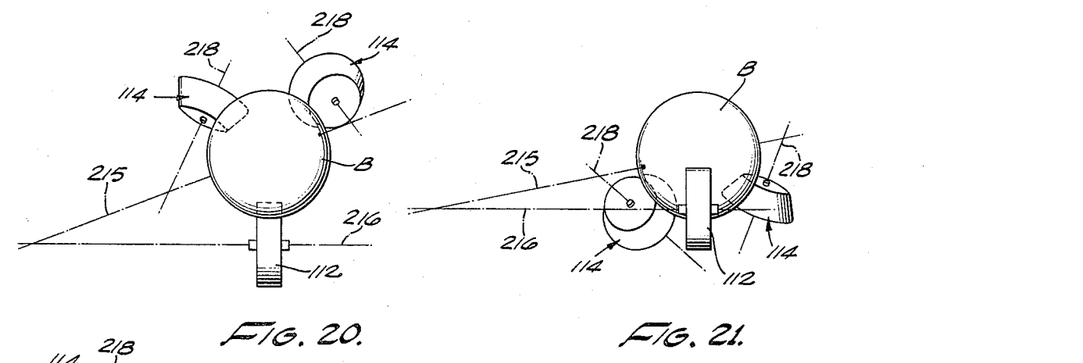
FIG. 20 is a plan view similar to FIG. 18 at another stage in the winding cycle.
FIG. 21 is an end elevation of the structure shown in FIG. 20.
Figure 22:
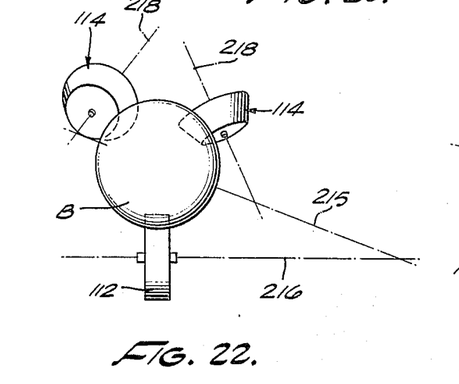
FIG. 22 is a plan view similar to FIGURES 18 and 20 showing the winding mechanism at still another stage in the winding cycle.
Figure 23:
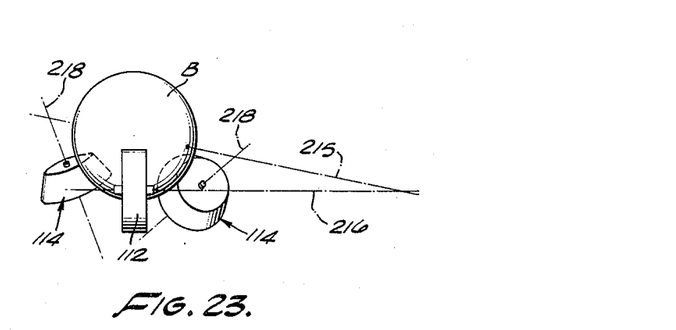
FIG. 23 is an end elevation of the structure shown in FIG. 22.

The oscillating action of the two beveled idler rollers 114 and their effect on the rotation of the ball B may be understood by reference to FIGS. 18 to 23. FIGS. 18 and 19 show both of the idler rollers 114 at their mid points of oscillation; FIGS. 20 and 21 show the two idler rollers at one extreme of their range of oscillation; and FIGS. 22 and 23 show the two idler rollers at the other extreme of their range of oscillation. The axis of rotation of the ball B is indicated by the broken line 215. In FIGS. 18 and 19, this axis 215 is parallel with the axis of rotation 216 of the drive roller 112. The axis 215 of the ball oscillates in the same plane as the axis 216 and through the center of the ball, except for the momentary transition position of the axis shown in FIG. 18, the axis 215 intersects the axis 216 as shown in FIGS. 22 and 23.

The two axes of rotation 218 of the two idler rolls 114 oscillate in the plane passing through the axis of rotation 215 of the ball B and constantly intersect the axis 215. While this arrangement of two beveled idler rollers differs somewhat from the arrangement of idler rollers in the first described apparatus, the winding operation is performed in the same manner and is characterized by the same winding cycles as heretofore described.

Any suitable means may be provided to actuate the two drive shafts 170 and 172 in unison and to reciprocate the shaft 212 in the desired time relation to rotation of the two drive shafts. In this particular embodiment of the invention, the actuation of the two drive shafts and the reciprocative shaft is accomplished at a control station on a control platform 220 shown in 9a, this platform being elevated to approximately the level of the platform 110 of the two rows of winding stations.

A single drive motor (not shown) below the platform 220 actuates a drive sprocket 222 and a sprocket chain 224 extends upward therefrom through a slot 225 in the platform to a sprocket 226 on a countershaft 228. The countershaft 228 is journaled in a pair of bearings 230 and is connected by couplings 232 with two gear boxes 234 and 235. The gear box 234 drives the previously mentioned drive shaft 170 and the gear box 235 drives the second drive shaft 172.

The shafts 170, 172 and 228 rotate all the time as long as the machine is in operation. Accordingly, all the drive rollers 112 are driven by the above-mentioned single motor at a substantially constant speed. The motor need not be a synchronous motor because the entire system is driven by the single motor.

The drive shaft 170 extends through the gear box 234 into an electrically controlled dwell clutch 236 and carries a sprocket 238. It is the dwell clutch 236 which, when it is de-energized, terminates the pause, or the dwell, period. The sprocket 238 is connected by a sprocket chain 240 with a sprocket 242 that is operatively connected to gearing in a gear box 244. A shaft 245 extending from the gear box 244 carries a counting cam 246 (FIGS. 9a and 13). A stud 248 on the face of the counting cam actuates the operating arm 250 of a suitably normally closed switch 252 and thereby creates the required footage pulses for controlling the previously mentioned counters 190 at the various winding stations.

The dwell clutch 236 releasably connects the drive shaft 170 with a stub shaft 254 that is journaled in a pair of spaced bearings 255 and carries what may be termed a dwell-timing cam 256 (FIGS. 9a and 12). This cam has two diametrically opposite lugs 258 on its face for actuating the operating arm 260 of a normally closed, dwell-timing cam switch 262. The stub shaft 254 is provided with an electrically controlled brake 263.

As mentioned previously, opening of switch 262 terminates the pause period and simultaneously starts the wind period.

The second drive shaft 172 extends through the gear box 235 and carries a sprocket 264 that is connected by a sprocket chain 265 with a second sprocket 266. The second sprocket 266 is on a countershaft 268 that is journaled in a bearing 270 and extends into an electrically controlled oscillation or reciprocation clutch 272. Clutch 272, when energized, oscillates, or reciprocates, rod 212 which, in turn, oscillates rollers 114. Therefore, clutch 272 controls the duration of the wind period. The oscillation clutch 272 releasably connects the countershaft 268 with a short shaft 274 that extends through a gear box 275. The short shaft 274 carries what may be termed a dwell-selector cam 276 (FIGS. 9a and 11) having a single lug 278 for actuation of the operating arm 280 of a left dwell switch 282 and alternately for actuation of the operating arm 284 of a right dwell switch 285. Both of these switches are normally open. As stated previously, cam 276 terminates one wind period when rollers 114 are in the extreme right position, and then at the end of the next wind period when rollers 114 are in the extreme left position. A stub shaft 286 extending from the gear box 275 carries a crank 288 having a crankpin 289 and this crankpin actuates a connecting rod 290 that is connected by a pivot pin 292 to the end of the previously mentioned reciprocative shaft 212.

The short shaft 274 extends from the gear box 275 into an electrically controlled oscillation brake 294 and also carries a sprocket 295. The sprocket 295 is connected by a sprocket chain 296 with a sprocket 298 on a stub shaft 300 that extends into a gear box 302. A stub shaft 304 carried by the gear box 302 mounts what may be termed a master dwell cam 305 (FIGS. 9a and 10). This cam carries a single lug 306 to actuate the operating arm 308 of a normally open master dwell cam switch 310, which controls the duration of the wind period by terminating it by a momentary closing of switch 310.

The manner in which control system shown in FIG. 9a operates for its purpose may be understood by reference to the wiring diagram in FIG. 17. Alternating current is supplied by a pair of leads 312 and 314 and is rectified by a network 315 to supply direct current to a pair of leads 316 and 318, the direct current being employed to energize the two sets of clutches and brakes which are used to control the wind and the pause periods. A relay coil R controls a set of three relay contactors R–1, R–2 and R–3. There is one circuit for energizing the relay coil R and a second circuit for de-energizing the coil.

As long as relay R is energized, the machine has a dwell, or pause, period, and when relay R is de-energized the machine has a wind period.

In FIG. 17, all elements, and especially the switches and the relay R contactors, R–1, R–2 and R–3, are illustrated in their normal position when relay R is de-energized. With all the contactors R–1, R–2 and R–3 in their upper positions (relay R is de-energized because switches 310, 282 and 285 are open and contactor R–1 is in its upper position, thus keeping circuit 330 to relay R also open), the circuits to the oscillation clutch 272 and the dwell brake 263 are closed and thus energized. Therefore, the entire control system, as shown in FIG. 17, is in the wind position.

As will be described more in detail below, relay R is momentarily energized during the pause period through the closing of switch 310 and then either switch 282 or 285 by their respective cams; relay R is then locked in its energized position through circuit 330, including contactor R–1 and the normally closed switch 262. Switch 262 remains closed for the desired duration of the pause, or dwell, period, and switch 262 is then opened by its dwell timing cam 256, which de-energizes relay R and thus again starts the wind period and terminates the swell period.

The circuit for energizing the relay coil R comprises the master dwell cam switch 310 and the left and right dwell switches 282 and 285 in parallel therewith. The master dwell cam switch 310 is connected to the A.C. lead 312 and is connected to the left and right dwell switches 282 and 285 by a wire 320 and branch wires 322 and 324. The second sides of the left and right dwell switches 282 and 285 are connecterd to a wire 325 which, in turn, is connected to the relay coil R by a wire 326. The second side of the relay coil R is connected to the second A.C. lead 314.

Therefore, energization of relay R is controlled jointly by switch 310 and one of the switches 282 or 285, switch 310 being connected in series with these dwell selector switches.

The alternate circuit for energizing the relay coil R includes the dwell-timing cam switch 262 and the contactor R–1, this contactor serving to lock the circuit as long as the dwell-timing cam switch 262 is closed. Switch 262 is normally closed, and therefore, relay R becomes locked immediately after the completion of its energization circuit 310–285 or 310–282 and closing of the lower contacts my armature R–1 of relay R upon its energization. The dwell-timing cam switch 262 is directly connected to the A.C. lead 312 and is connected by a wire 328 with one of the two contacts associated with the contactor R–1, the other of the two contacts being connected to the previously mentioned wire 326 by a wire 330.

When a predetermined number of revolutions of the two drive shafts 170 and 172 for actuating the driving rollers 112 at the multiple winding stations are completed to carry out a selected winding cycle on the balls B at the winding stations, the lug 306 on the master dwell cam 305 closes the normally open switch 310 momentarily and before this switch opens, the lug 278 on the dwell-selector cam 276 closes either the left dwell switch 282 or the right dwell switch 285, thereby energizing the relay coil R. Energization of the relay coil R actuates the relay contactor R–1 to lock the relay, the normally closed dwell timing cam switch 262 being closed at this time. After a predetermined degree of rotation of the two driving shafts 170 and 172, one of the lugs 258 of the dwell-timing cam 256 momentarily opens the normally closed dwell-timing cam switch 262 to de-energize the relay coil R, which terminates the pause period and starts the wind period.

As long as the relay coil R is de-energized, the contactors R–2 and R–3 energize the dwell brake 263 and the oscillation clutch 272 respectively. The circuit through the dwell brake 263 includes one of the two contacts associated with the contactor R–2, which contact is directly connected to the D.C. lead 316, the other of the two contacts being connected to one side of the dwell brake 263 by a wire 330. The second side of the dwell brake 263 is connected directly to the second D.C. lead 318.

The circuit through the oscillation clutch 272 includes one of the two contacts associated with the contactor R–3, which contact is directly connected to the D.C. lead 316 and includes a wire 332 that connects the other of the two contacts with one side of the oscillation clutch 272. The other side of the oscillation clutch 272 is directly connected to the second D.C. lead 318.

Everything to the left of clutch 272 in FIG. 9a is stationary during the pause period and is rotating during the wind period.

When the relay coil R is energized, contactors R–2 and R–3 de-energize the dwell brake 263 and oscillation clutch 272 respectively, and energize the dwell clutch 236 and the oscillation brake 294, respectively. The circuit through the dwell clutch 236 includes one of the two contacts associated with the contactor R–2, which contact is directly connected to the D.C. lead 316, and includes a wire 334 that connects the other of the two contacts with the dwell clutch. The other side of the dwell clutch 236 is directly connected to the second D.C. lead 318. The circuit for energizing the oscillation brake 294 includes one of the two contacts associated with the contactor R–3, which contact is connected directly to the D.C. lead 316, and includes a wire 336 that connects the second contact with the oscillation brake. The other side of the oscillation brake is directly connected to the second D.C. lead 318.

It is apparent that the dwell brake 263 and the oscillation clutch 272 are normally energized during a winding period, the dwell brake being effective to immobilize the dwell timing cam 256 and the oscillation clutch being engaged for actuation of both the oscillation crank 288 and the master dwell cam 305. At the end of a predetermined winding period the master dwell cam 305 closes the master dwell cam switch 310 and the dwell-selector cam 276 closes either the left dwell switch 282 or the right dwell switch 285 to energize the relay coil R.

The relay, which locks itself, de-energizes both the dwell brake 263 and the oscillation clutch 272 and energizes both the dwell clutch 236 and the oscillation brake 294. Energization of the dwell clutch 236 causes actuation of the normally idle dwell-timing cam 256 and energization of the oscillation brake 294 stops both the oscillation crank 288 and the master dwell cam 305 for the duration of the pause period. The arrangement is such, however, that the master dwell cam 305 in coming to a stop coasts sufficiently to carry the cam lug 306 beyond the operating arm 308 of the master dwell cam switch 310 so that the master dwell cam switch 310 remains closed momentarily.

The dwell timing cam 256 rotates to a predetermined extent and then opens the normally closed dwell timing cam switch 262 to break the relay circuit. Breaking the relay circuit to restore the contactors R–1, R–2 and R–3 to their normal position restores normal operation for the next winding period.

The lug 278 of the dwell-selector cam 276 operates the left dwell switch 282 and the right dwell switch 285 alternately at the ends of the successive winding periods. Thus, at the end of one winding period the crank-pin 289 of the crank is stopped at the extreme right position shown in FIG. 9a, and at the end of the next winding period it is stopped at a diametrically opposite leftward position. Consequently, one winding period terminates with all of the idler rollers 114 at their extreme rightward positions of oscillation and the next winding cycle terminates with all the idler rollers in their extreme leftward positions of oscillation. When rollers 114 are in such extreme positions then the circular arc, or the circular sector, which is wound during the pause period, is a small circle. When rollers 114 are made to stop midway between their extreme positions, then the circular arc, or the sector, is a true great circle. Either arrangement is suitable for practicing this invention. Whether the arc is a small or a great circle is determined by the position of lug 278 on the dwell cam 276.

It is to be understood that the wound layer is not necessarily the carcass layer of the ball. In fact, a feature of one practice of the invention is the use of a winding technique to form an outer, inner and/or under cover layer, this technique having special usefulness in providing ball covers of materials that cannot be applied by existing methods. The winding material used in this particular practice of the invention should be uncured when applied and then cured. Suitable materials for this purpose include vinyl resins, polyesters, rubber latex and moldable nylon.

Figure 24:
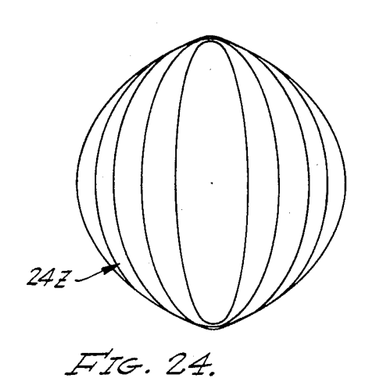
FIG. 24 is a side elevational view of a ball wound with substantially great circles in accordance with the prior art.
Figure 25:
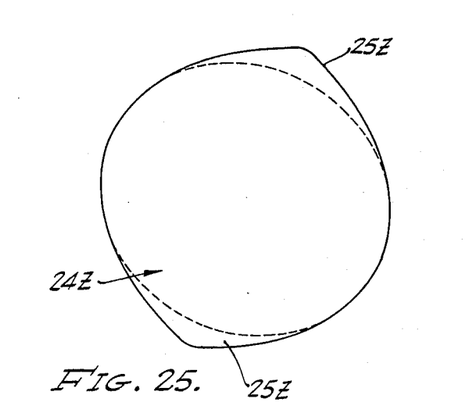
FIG. 25 is a diagrammatic view of the ball shown in FIG. 24.

It is an outstanding feature of the invention that the ball wound in accordance with the present invention does not provide continued build-up at crossover points. For example, as shown in FIG. 1, turns 1, 2, 3, 4, 5 and 6 pass a single point P which has a corresponding point on the opposite side of the ball. If winding pole P and its diametrically opposite pole were the only two employed in winding the whole ball, it would become oblong in shape as indicated at 24Z in FIG. 24. Still further, it would become oblate because with any finite cord tension the ball would be squeezed out of shape. The oblong but oblate nature of the ball 24Z is better illustrated at 25Z schematically in FIG. 25. Thus, by winding through diametrically opposed points, an unusual benefit is made of the strength of the cord wound on the ball. However, as important as the fact that turns are wound through diametrically opposed points is the fact that a plurality of sets of turns are provided having diametrically opposed points spaced from preceding ones wound. Thus, the ball does not become oblong as indicated in FIG. 25. The disadvantages of the ball being oblong are obvious. In the first place it will not be satisfactory when it is used. Secondly, it will wear out sooner than a ball that is uniformly wound in thickness.

It is to be understood further that one or more strands of a filamentary material may be wound on a ball simultaneously and further that these strands need not necessarily be braided.

Figure 26:
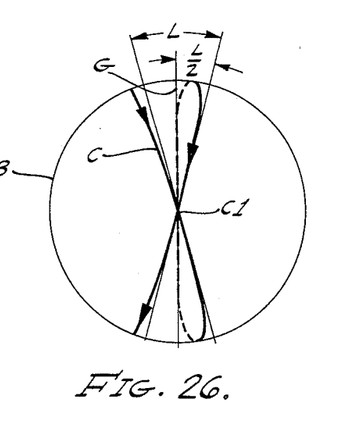
FIG. 26 is a perfect plan view of the ball shown in FIG. 1 shown diagrammatically.
Figure 27:
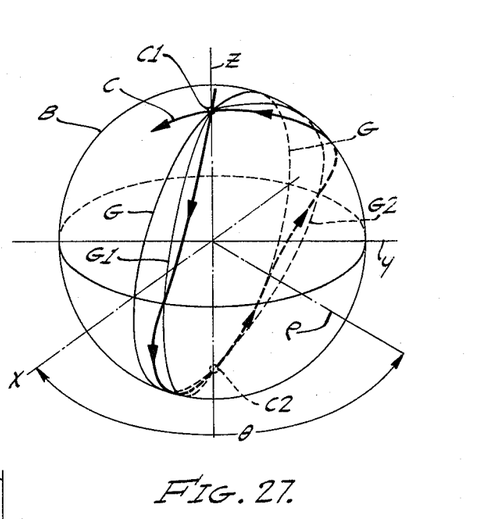
FIG. 27 is a perspective view of the ball showing hidden lines.

In accordance with a special feature of the invention, the free rollers 44 and 114 in either embodiment of the invention shown in the drawings will wind the cord or length of stranded material on the ball on a curve indicated at curve C in FIG. 26 on the ball B. Only a little more than one winding turn is shown for clarity. The turn has been dotted on the side of the ball which cannot be seen in view of FIG. 26. It is to be noted that the curve C crosses itself on the side which can be seen. On the side that cannot be seen, it is tangent to the great circle G. This same great circle G bisects the angle between its own crossover point. The same is shown in FIG. 27. From the curves shown in FIGS. 26 and 27, it can be seen that the unusual character of curve C permits winding a ball with turns of a cord nearly on great circles, but with a very small deviation so that an angle is produced at crossovers, for example, at the point C1 shown in FIG. 26. Still further, this makes for a convenient method of changing the winding poles. The curve C may be visualized in structure by taking a loop of wire and twisting and holding its two ends.

The harmonic motion of free rollers 44 and 114 produces a curve C because during each succeeding half cycle the ball B is rotated in opposite directions about a minor axis z perpendicular to the plane through the axis of drive roller 112 and the center of the ball. However, the fact that this is synchronized with half cycles of the ball about the rotational axis 215 shown in FIG. 18 means that the ball is, in fact, turned in the same direction constantly about an axis through the winding poles C1 and C2 shown in FIG. 27. This means that several turns, such as those indicated in FIG. 1, may be wound on winding poles in positions for maximum supporting strength before the symmetry is upset by some other mechanism, such as, for example, by arresting the oscillation of rollers 44 and 114 for a certain pause as is actually done.

It is to be noted at this point that the ball physically rotates only in one direction about one axis. However, for purposes of analysis, the angular velocity of the ball can be and preferably is resolved vectorially into two components: One component about the minor axis z in FIG. 27 and one component about an axis y shown in FIG. 27. Although the speed of the ball about the minor axis z shown in FIG. 27 may approximate simple harmonic motion, this is not necessarily true. At least, it is obvious that the first harmonic of this motion will be rather large in comparison to any subsequent harmonic.

Figure 28:
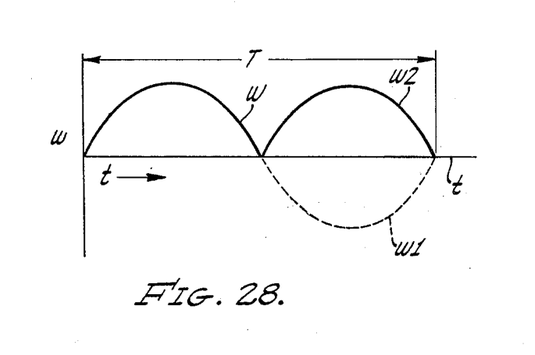
FIG. 28 is a graph of a function $z$ illustrating a change in speed of rotation of the ball about a certain axis as it is wound on the apparatus of the invention.

Normally, the speed of the ball about the minor axis z, which may be called $\omega$, may be represented as a function of time $t$, as indicated in FIG. 28. Normally, for simple harmonic motion, a waveform W would be sinusoidal and drop below the abscissa $t$, as indicated in dotted lines at W1. However, since the ball is rotated synchronously with free rollers 44 and 114, the ball actually rotates in the same direction and follows the curve W2 during the second half of the period T, of this sinusoidal function. It is to be noted that rectangular coordinates, $x$, $y$ and $z$ may be expressed in three cylindrical coordinates $\rho$, $\theta$ and $z$ all of which are shown in FIG. 27.

From the foregoing, it will be appreciated that the plurality of sets of turns over several sets of spaced diametrically opposed pairs of winding poles provide very uniform winding on the ball R. Still further, use of the particular curve wound by the apparatus of both the embodiments of the invention, and as indicated in FIGS. 26 and 27, securely retain the ball and fully utilize the strength of the cord by approximating great circles in a manner such that the smooth curve C (FIGS. 26 and 27) is very close to a great circle.

It is to be noted that great semi-circles G1 and G2, as illustrated in FIG. 27, will appear as straight lines separating the dotted and solid portions of the curve C in the upper and lower half of the ball B shown in FIG. 26.

Figure 29:
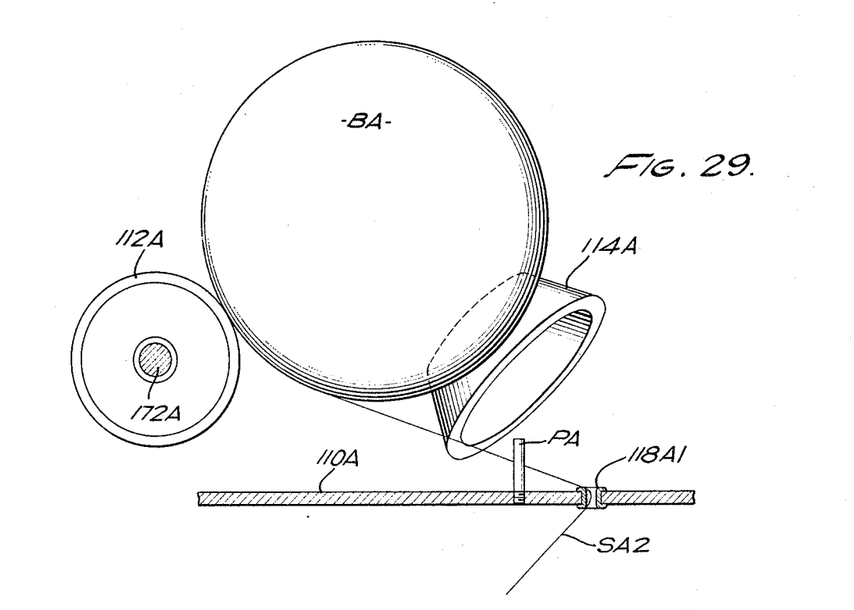
FIG. 29 is a diagrammatic view of an embodiment of the invention different from that shown in FIG. 14.
Figure 30:
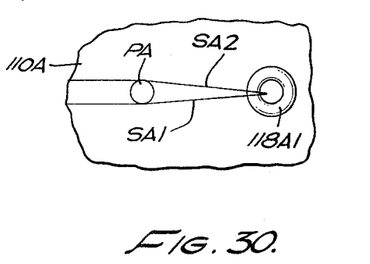
FIG. 30 is a plan view of additional apparatus incorporated in the embodiment shown in FIG. 20 over that shown in FIG. 14.

Still further, it is to be noted that two strands of filamentary material may be wound on a ball simultaneously to advantage to reduce winding time. Such apparatus is shown in FIG. 29 including a ball BA which may be identical with the ball B shown in FIG. 14 and a drive roller 112A on a shaft 172A, a pair of oscillatory rollers 114A, only one being shown, and a table 110A, all of the new structures also being substantially identical with those corresponding structures shown in FIG. 14 and given the same designation except for the last letter "A" employed in all the reference characters in FIG. 29. An eyelet 118A is shown extending through table 110A to guide filamentary strands SA1 and SA2. Pin PA is also shown to separate strand SA2 from a second strand SA1 shown in FIG. 30. Pin PA is shown between strands SA1 and SA2 in FIG. 30.

Figure 31:
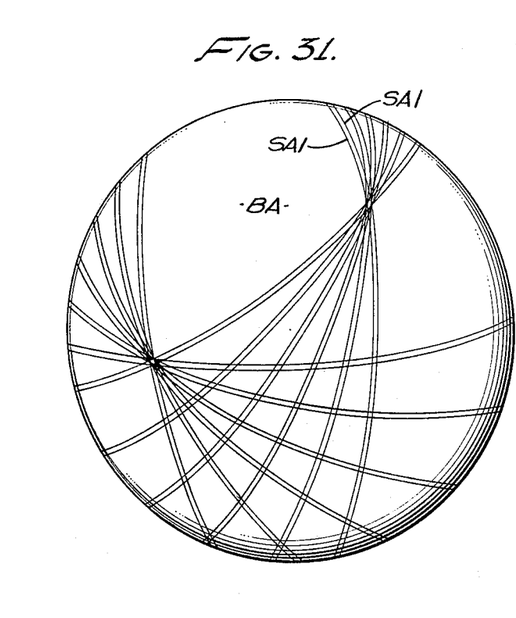
FIG. 31 is an elevation view of a ball wound with the apparatus shown in FIG. 29.

The ball BA at least partially wound with the strands SA1 and SA2 is shown in FIG. 31.

My description in specific detail of selected practice and embodiments of the invention, by way of example and to illustrate the underlying principles, will suggest various changes, substitutions and other departures from

What is claimed is:

1. A hollow sphere including flexible reinforcing windings on its outer surface and comprising, in combination, a plurality of reinforcing windings, said windings being arranged to define sets of windings with the windings of each set approximating great circles, each successive winding of a first set of windings being a continuation of and spaced from a preceding winding of said first set, each successive winding of said first set crossing the preceding winding of said first set at diametrically opposed first and second polar areas on said sphere to form a group of crossover points on said first and second polar areas, the first winding of a second set of windings being a continuation of the last winding of said first set of windings, each successive winding of said second set of windings being a continuation of and spaced from a preceding winding of said second set, each successive winding of said second set crossing the preceding winding of said second set at diametrically opposed third and fourth polar areas on said sphere to form a group of crossover points on each of said third and fourth polar areas, the distance between the group of crossover points formed in the first polar area and the group of crossover points formed in the third polar area being substantially greater than the distance spanned by the group of crossover points in any of said four preceding polar areas, and the distance between the group of crossover points formed in the second polar area and the group of crossover points formed in the fourth polar area being substantially greater than the distance spanned by the group of crossover points in any of said four preceding areas.

2. A hollow sphere in accordance with claim 1 in which the successive windings of said first set are equally spaced apart at an angle of approximately 15°.

3. A hollow sphere in accordance with claim 2 in which the successive windings of said second set are equally spaced apart at an angle of approximately 15°.

4. A hollow sphere in accordance with claim 1 in which the material of said windings is a cord of a diameter in the range of .002 inch to .012 inch.

5. A hollow sphere in accordance with claim 1 and in which said hollow sphere is an inflatable bladder; and said hollow sphere and reinforcing windings form a portion of an inflatable ball.

6. A hollow sphere including a flexible reinforcing winding on its outer surface and comprising in combination, a plurality of sets of reinforcing windings, a first set of windings comprising a first winding passing through diametrically opposed first and second pole points, a second winding spaced from said first winding and crossing said first winding at each of said pole points, a third winding crossing said second winding at said pole points and spaced from said second winding in the same direction as said second winding is spaced from said first winding, a fourth winding crossing said third winding at each of said pole points and spaced from said third winding in the same direction that said third winding is spaced from said second winding, each of said windings approximating a great circle of said sphere; a second set of windings like said previously defined first set of windings, said second set of windings including first, second, third and fourth windings passing through diametrically opposed third and fourth pole points with successive ones of said second set of windings crossing at said third and fourth pole points; each of said windings of each of said sets being a continuation of an immediately preceding winding; said first winding of said second set being a continuation of the last winding of said first set, said first pole point being spaced from said third pole point and said second pole point being spaced from said fourth pole point.

7. A hollow sphere in accordance with claim 6 and which further includes a third set of reinforcing windings like said previously defined first and second sets of windings, said third set of windings including first, second, third and fourth windings passing through diametrically opposed fifth and sixth polar points, said first winding of said third set being a continuation of the last winding of said second set, successive ones of said third set of windings crossing immediately preceding windings of said third set at said fifth and sixth pole points, said fifth pole point being spaced from said first pole point and said third pole point, and said sixth pole point being spaced from said second pole point and said fourth pole point.

8. A hollow sphere including flexible reinforcing windings on its outer surface and comprising, in combination, a plurality of reinforcing windings, said windings being arranged to define sets of windings with the windings of each set approximating great circles, each successive winding of a first set of windings being a continuation of and spaced from a preceding winding of said first set, each successive winding of said first set crossing the preceding winding of said first set at diametrically opposed first and second polar areas on said sphere to form a group of crossover points on said first and second polar areas, the first winding of a second set of windings being a continuation of the last winding of said first set of windings, each successive winding of said second set of windings being a continuation of and spaced from a preceding winding of said second set, each successive winding of said second set crossing the preceding winding of said second set at diametrically opposed third and fourth polar areas on said sphere to form a group of crossover points on each of said third and fourth polar areas, the first winding of a third set of windings being a continuation of the last winding of said second set of windings, each successive winding of said third set being a continuation of and spaced from a preceding winding of said third set, each successive winding of said third set crossing the preceding winding of said third set at diametrically opposed fifth and sixth polar areas on said sphere to form a group of crossover points on said fifth and sixth polar areas; the distances between the groups of crossover points formed in said first, third, and fifth polar areas being substantially greater than the distance spanned by the group of crossover points in any of said six preceding areas, and the distances between the groups of crossover points in the second, fourth and sixth polar areas being substantially greater than the distance spanned by the group of crossover points in any of said six preceding areas.

References Cited by the Examiner

UNITED STATES PATENTS

| 1,270,009 | 6/1918 | Cobb. | |
| 2,061,604 | 11/1936 | Winterbauer | 273—65 |
| 2,153,410 | 4/1939 | Bogoslowsky | 273—224 |
| 2,380,370 | 7/1945 | Smith | 273—65 |
| 2,730,159 | 1/1956 | Semegen | 273—222 X |
| 2,761,684 | 9/1956 | Crowley et al. | 273—65 |
| 2,995,311 | 8/1961 | Holman | 273—65 |

DELBERT B. LOWE, *Primary Examiner.*

G. J. MARLO, *Assistant Examiner.*